N. E. DAWSON.
Phonetic and Diacritical Notation.

No. 198,507. Patented Dec. 25, 1877.

| Fig. 1. | Fig. 2. | Fig. 3. | Fig. 4. | Fig. 5. |
|---|---|---|---|---|
| — kay | — gay | \| tee | \| dee | / chay |
| Fig. 6. | Fig. 7. | Fig. 8. | Fig. 9. | Fig. 10. |
| / jay. | \\_ pee | \\ bee | ) ish | ) zhee |
| Fig. 11. | Fig. 12. | Fig. 13. | Fig. 14. | Fig. 15. |
| ) ess | ) zee | ( ith | ( thee | \\ ef |
| Fig. 16. | Fig. 17. | Fig. 18. | Fig. 19. | Fig. 20. |
| \\ vee | ⌣ ing | ⌣ en | ⌢ em | ⌢ hay |
| Fig. 21. | Fig. 22. | Fig. 23. | Fig. 24. | Fig. 25. |
| ( el | \\ ar | ( yay | ) way | O a. |
| Fig. 26. | Fig. 27. | Fig. 28. | Fig. 29. | Fig. 30. |
| O a. | Ө a. | Ө e | O e | O i |
| Fig. 31. | Fig. 32. | Fig. 33. | Fig. 34. | Fig. 35. |
| O a | O o | Ө o | Ө u | O oo |
| Fig. 36. | Fig. 37. | Fig. 38. | Fig. 39. | Fig. 40. |
| O oo | ∧ ai | ∨ i | < oi | > ow |

Witnesses:
T. C. Brecht
James C. Boyce

Inventor:
Noble E. Dawson

UNITED STATES PATENT OFFICE.

NOBLE E. DAWSON, OF BURLINGTON, IOWA.

IMPROVEMENT IN PHONETIC AND DIACRITICAL NOTATION.

Specification forming part of Letters Patent No. 198,507, dated December 25, 1877; application filed November 26, 1877.

*To all whom it may concern:*

Be it known that I, NOBLE E. DAWSON, of Burlington, in the county of Des Moines and State of Iowa, have invented a new and useful Improvement in Phonetic and Diacritical Notation, of which the following is a specification:

The invention relates to phonotypy, or a typographic notation for expressing human language by a combination and arrangement of distinct characters, representing distinct sounds, into words and sentences.

Heretofore such notation has been effected by means of complex characters difficult to fix in the mind, used to represent simple sounds, these complex characters being grouped into words and arranged into sentences. This method of notation is objectionable, in that it necessitates the learning, at the expense of much time and effort, of difficult, arbitrary, and complex characters, where a simple character would answer every useful, if not every purely æsthetic, requirement, and obviate much of the cost of time and effort required to accomplish the acquisition of the said complex characters, besides preserving a certain analogy with the simple sounds with which the character is associated. It is also objectionable, in that the complex characters are, to an appreciable extent, deleterious to the eye of the reader, not noticeable, perhaps, to the casual reader who enjoys perfect eye-sight, but amounting in other and less favored cases to great hinderance, if not to a denial of the pleasure and profit of reading, except under the penalty of much suffering, and the possible impairment of vision. It is confidently believed that this simplification effects an improvement in this particular equaling in good results the extent of evil that would ensue from a fivefold multiplication of the number of curves, strokes, dots, angles, loops, and other appendages that go to make up the letters of the ordinary notation.

It may be observed that most of the improvements in phonetic notation as it exists seek, by increasing the intricacy and varying the complexity of the letters of the alphabet, to represent the various simple sounds of which language is composed, and thus seem to overlook the true principle upon which phonographic short-hand was based, and which gave rise to the first great movements in the direction of phonetic reform. That principle, it seems to me, should be kept in view in a phonetic notation, as well as the preservation of a close analogy between the phonetic and phonographic notations.

Therefore, the object of my invention is to provide, first, a system of notation adapted to typographical representation, by means of which language may be so presented as that, the printed word being given, its pronunciation shall be instantaneously, unmistakably, and invariably recognized, though the reader may never have spent an hour in learning to spell after having acquired this alphabet; second, a system of phonetic and diacritical notation, by which the elementary sounds of words shall be represented by the simplest possible characters, easily learned by the young, and not pernicious to the eye of the aged reader; and, third, a system of notation as nearly uniform with the best current systems of stenography as the requirements of the art of printing will admit.

This invention, which comprises forty distinct and separate characters, as set forth in the accompanying drawing, consists, chiefly, in the twelve signs representing the simple vowels, the rest being modifications of old forms to meet the requirements of typography; and the distinctive feature of these twelve symbols or characters consists in the use of an ellipse, or figure of a general elliptical, oval, or elongated contour, as the diacritical expedient for adapting these forms to typography, while preserving the requisite close analogy to the characters used in phonography to represent the same sounds. This is the function of the ellipse by becoming a part of each of the twelve vowel-signs. The required analogy between the phonographic and phonotypic characters for representing the same consonant or diphthong sounds is easily obtained with but slight modification of these characters. Not so with the simple vowels.

To use the phonographic vowel-symbols so slightly modified as the consonant-symbols would cause these vowel-signs to conflict with and disarrange the ordinary punctuation, (almost the only part of the ordinary alphabet indispensable to this notation,) because it cannot be improved upon.

To apply arbitrary symbols to the vowels would be to violate a fundamental principle of this notation; but the ellipse is the diacritical expedient that obviates all difficulties, and gives us twelve new symbols or characters, which are formed by placing the phonographic vowel-signs inside the oval, respectively, as follows: the four first-place vowel-signs near the top of the ellipse, as represented in the drawing, Figs. 25, 26, 31, and 32; the four second-place in the center of the ellipse, as represented in the drawing, Figs. 27, 28, 33, and 34; the four third-place phonographic vowel-signs near the bottom of the ellipse, as represented in the drawing, Figs. 29, 30, 35, and 36.

The method of using these twelve vowel-signs, like that of the consonant and diphthong signs of the drawing, is to combine them into words and sentences in the order in which the sounds which they respectively represent are heard in the spoken language, as in the following example:

"▱◯◯◯ ◯◯ ◯ ◯◯◯◯ ◯◯ ◯◯ ◯◯,

◯◯ ◯◯ ◯◯ ◯◯, ◯◯ ◯◯, ◯◯ ◯◯ ◯◯ ◯◯."

of which the following is the transcript:

"Whoever thinks a faultless piece to see,
Thinks what ne'er was, nor is, nor e'er shall be."

The powers given to these symbols or characters are, respectively, as follows:

| No. of figure. | Name. | Sound represented. |
|---|---|---|
| 1 | kay | c in can and k in kelt. |
| 2 | gay | gue in league and g in gilt. |
| 3 | tee | ed in looked and t in tame. |
| 4 | dee | ed in loved and d in dame. |
| 5 | chay | tch in match and ch in chest. |
| 6 | jay | g in gem and j in jest. |
| 7 | pee | pp in copper and p in pay. |
| 8 | bee | bb in ebb and b in bay. |
| 9 | ish | s in sure and sh in shun. |
| 10 | zhu | z in azure and s in vision. |
| 11 | ess | c in icy and s in seal. |
| 12 | zee | s in was and z in zeal. |

| No. of figure. | Name. | Sound represented. |
|---|---|---|
| 13 | ith | th in pith and th in thigh. |
| 14 | thee | the in breathe and th in thy. |
| 15 | ef | ph in phase and f in fan. |
| 16 | vee | f in of and v in van. |
| 17 | ing | n in finger and ng in singer. |
| 18 | en | kn in know and n in no. |
| 19 | em | mb in lamb and m in ham. |
| 20 | hay | wh in whole and h in hole. |
| 21 | el | ln in kiln and l in lay. |
| 22 | ar | wr in write and r in right. |
| 23 | yay | e in euchre and y in you. |
| 24 | way | u in persuade and w in wade. |
| 25 | | a in arm. |
| 26 | | a in at. |
| 27 | | a in ale. |
| 28 | | e in met. |
| 29 | | e in eat. |
| 30 | | i in pin. |
| 31 | | a in fall and au in maul. |
| 32 | | o in on. |
| 33 | | o in note. |
| 34 | | u in up. |
| 35 | | oo in food. |
| 36 | | oo in foot. |
| 37 | | ai in air. |
| 38 | | i in kite. |
| 39 | | oy in boy and oi in boil. |
| 40 | | ough in plough and ow in cow. |

(Name the vowels and diphthongs by their own proper sounds.)

Capitals are indicated by two parallel lines placed under the phonotype, as in the foregoing example; Italics, by one line underscored.

What I claim is—

1. As an improvement in phonetic and diacritical notation, the symbols or characters substantially hereinbefore described, and shown in Figs. 1 to 40, inclusive, of the drawing.

2. The method of representing the twelve simple vowel-sounds of the English language by means of the symbols or characters substantially as hereinbefore described, and represented by Figs. 25 to 36, inclusive, of the drawing.

NOBLE E. DAWSON.

Witnesses:
T. C. BRECHT,
J. W. HAMILTON JOHNSON.